Figure 1:
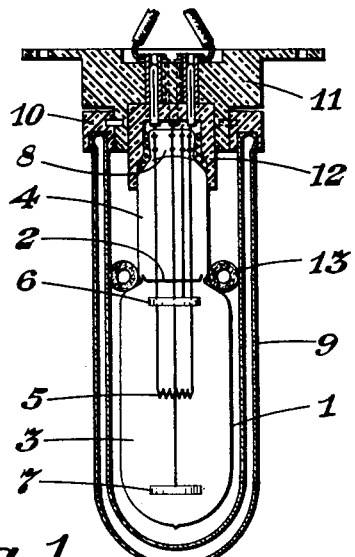

Dec. 21, 1937.  G. HOLST ET AL  2,103,078

GASEOUS ELECTRIC DISCHARGE LAMP

Filed Oct. 30, 1934

INVENTORS
Gilles Holst
Willem Uyterhoeven
BY Harry E. Dunham
ATTORNEY

Patented Dec. 21, 1937

2,103,078

UNITED STATES PATENT OFFICE 2,103,078

GASEOUS ELECTRIC DISCHARGE LAMP

Gilles Holst and Willem Uyterhoeven, Eindhoven, Netherlands, assignors to General Electric Company, a corporation of New York Application October 30, 1934, Serial No. 750,713
In the Netherlands November 4, 1933

6 Claims. (Cl. 176—122)

The present invention relates to gaseous electric discharge lamps generally and more particularly the invention relates to such devices which contain a vaporizable material the vapor of which is at an effective pressure only when the lamp container is at an elevated temperature.

Heat conservators, such as an evacuated envelope or a double walled jacket having the space between the walls thereof evacuated, which reduce the transfer of heat from the lamp container to the atmosphere are useful in maintaining the lamp container at an elevated temperature during the operation of the device. We have observed that in a lamp unit comprising a gaseous electric discharge lamp and a heat conservator of the double walled jacket type designed in such a way that the temperature distribution over the walls of the lamp container surrounding the discharge between the electrodes is such that the lowest temperature exists at the parts of the container walls adjacent the base end thereof changes in ambient atmospheric conditions, such as temperature changes, or wind, rain, or snow affect the vapor pressure in the lamp which deleteriously affects the efficiency of the lamp and the intensity of the light emitted thereby.

The object of the present invention is to provide a lamp unit comprising a gaseous electric discharge vapor lamp and a heat conservator wherein the influence of changes in ambient atmospheric conditions on the efficiency of the lamp is practically eliminated. Still further objects and advantages attaching to the device and to its use and operation will be apparent to those skilled in the art from the following particular description.

The invention attains this object by designing the lamp unit in such a way that, during the operation of the lamp unit the coolest part of the container surrounding the discharge is at a part thereof remote from the base end thereof. In lamp units of this type the heat of the parts of the container at the base end thereof is dissipated mainly by conduction and the heat of the parts thereof remote from the base end is dissipated mainly by radiation. We have demonstrated that when two elements are at different temperatures and the temperature of the element having the lower temperature is changed the influence on the temperature of the element having the higher temperature is greater when the heat transfer between the elements takes place mainly by conduction than when the heat transfer takes place mainly by radiation. We have utilized this fact in the present invention by designing the lamp unit in such manner that the coldest part of the lamp container surrounding the discharge is at a part thereof where the heat is transferred from said container to the surrounding atmosphere mainly by radiation.

Figure 2:
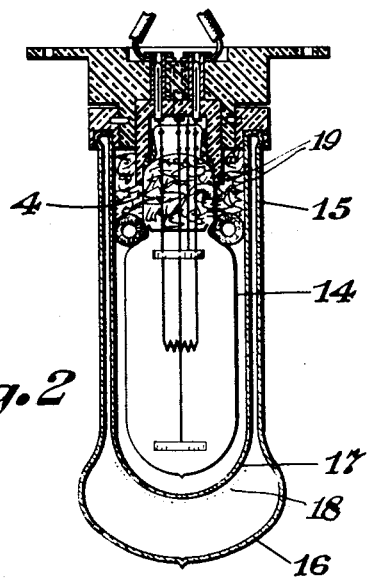

In the drawing accompanying and forming part of this specification two embodiments of the invention are shown in which Fig. 1 is a front elevational, partly sectional view of one embodiment of the invention, and Fig. 2 is a similar view of another embodiment of the invention.

Like numbers denote like parts in both the figures.

Referring to Fig. 1 of the drawing the new and novel lamp unit comprises a gaseous electric discharge lamp device having a container 1. The interior of said container 1 is divided into two parts by a septum 2, such as a disc shaped so as to be flexible and consisting of mica, glass or chrom-steel. Electrodes 5, 6 and 7 are mounted on leads which pass through said septum 2 and are located in the part 3 of said container 1. The spaces on either side of said septum 2 are connected by a long tube of small internal diameter (not shown for purposes of simplicity) the greater part of which is located in the part 4 of said container 1. This tube facilitates the exhausting of the container 1 through a single exhaust tip and is closed by deposits of condensed vapor shortly after the lamp device is started into operation and the space enclosed by container part 3 is completely closed off from the space enclosed by container part 4 thereafter.

The electrode 5 is the cathode and consists of a metal filament, such a a tungsten filament, wrapped with another filament, such as a nickel or tungsten filament, coated with an electron emitting material, such as barium oxide, and wound in the form of a helix. The electrodes 6 and 7 are annular anodes and are mounted at equal distances from and on opposite sides of said cathode 5. The electrode leads are surrounded by tubes of insulating material which tubes extend from the electrodes 5, 6 and 7, through the septum 2 to the pinch part 8 of the stem of said container 1. The distance between the anode 6 and the septum 2 is smaller than the distance between the anode 7 and the end of the container 1. During the operation of the device the septum 2 is heated to a higher temperature by the discharge between said electrodes 6, 7 and 5 (which is an arc discharge without a positive column) than the end wall of said container 1, that is, the part of said container 1 adjacent said anode 7 since said septum 2 is closer to the discharge between said electrodes than said end wall and consequently receives more heat from the discharge.

Said container 1 has therein a starting, rare gas, such as argon or neon, at a pressure of approximately 1 to 10 mm. and a quantity of vaporizable metal, such as sodium, is introduced into the part 3 of said container 1. The discharge between said electrodes 5, 6 and 7 starts in the gas and heats the container 1 to the vaporizing temperature of the sodium. Due to the heat insulating effect of the double walled jacket 9 and the heat emitted by the discharge the sodium vapor is at an effective pressure during the operation of the lamp unit. By an effective pressure we mean a pressure such that the light emitted by the lamp device is rich in rays characteristic of the sodium. Other metals, such as cadmium, thalium, magnesium, lithium, caesium, or zinc are used as the vaporizable metal, when desired.

The stem part of the container 1 between the pinch part 8 and the septum 2 is made longer than is usual in this type of lamp and a base 12 of insulation material is cemented to the end of said stem. As pointed out above said container 1 is surrounded by a double walled jacket 9, of glass, for example, having the space between the walls thereof evacuated. A ring 10 of insulating material having pins embedded therein is attached to said jacket 9. Said lamp base 12 and said ring 10 engage with the socket 11 which supports said lamp device and said jacket. A resilient, heat insulating ring 13 consisting of a coiled metal spring embedded in asbestos, for example, is interposed between said container 1 and the inner wall of said jacket 9 adjacent the septum 2 to close off the space between the part 3 of said container 1 surrounding said electrodes and the inner wall of said jacket 9 from the outer atmosphere. Said ring 13 also centers and assists in supporting said container 1 in said jacket 9.

The long distance between the septum 2 and the base 12, the jacket 9 which encloses the part of the container 1 between the base 12 and the septum 2, as well as the container 1, and the proximity of the gaseous electric discharge to said septum 2 and the comparative remoteness of said discharge from the end wall of said container 1 adjacent said anode 7 all serve to maintain said septum 2 and the parts of container 1 adjacent thereto at a higher temperature than the said end wall. The coldest part of said part 3 of the container 1 surrounding the discharge between said electrodes 5, 6 and 7 is at said end wall and the temperature of the coldest spot on said part 3 determines the vapor pressure in the lamp.

Since the heat transfer from the end wall to the outer atmosphere is by radiation rather than conduction changes in ambient temperature, or wind, rain or snow have very little effect on the vapor pressure in said container 1, as pointed out above.

The embodiment of the invention illustrated in Fig. 2 of the drawing is similar in all respects to that illustrated in Fig. 1 except that in this embodiment the distance between the septum 2 and its adjacent anode is the same as that between the end of the container 14 and its adjacent anode, the part 4 of the container 14 of the gaseous electric discharge lamp device is shorter than the corresponding part 4 of the lamp device illustrated in Fig. 1 and the part 16 of the outer wall of the double walled jacket 15 is enlarged which increases the dissipation of heat from the end 17 of the inner wall of said jacket 15 and consequently the end of said container 14. The end wall of said container 1 adjacent the end 17 of the inner wall of the jacket 15 is thus the coldest part of the container 14 during the operation of the lamp unit with the advantages pointed out above. The part 17 of the jacket 15 is roughened or blackened, as indicated by dots at 18, to increase the radiation of heat therefrom, the part 4 of container 1 and the space between the part 4 and the inner wall of jacket 15 are packed with glass wool 19 to reduce the heat losses from said part 4, when desired.

It will be understood, of course, that we contemplate that the different structures of Figures 1 and 2 can be combined to provide a lamp unit wherein the temperature of the end wall of the container is lower than that of the septum 2 and that the dissipation of heat from said end wall can be accomplished in other ways than that described above, such as by enlarging the said end wall of the container to dissipate the heat locally and that the different structural details herein described can be selected as desired to obtain a particular temperature differential between said septum and said end wall.

While we have shown and described and have pointed out in the annexed claims certain novel features of the invention, it will be understood that various omissions, substitutions and changes in the forms and details of the device illustrated and in its use and operation may be made by those skilled in the art without departing from the broad spirit and scope of the invention.

What we claim as new and desire to secure by Letters Patent of the United States is:—

1. A lamp unit comprising in combination a gaseous electric discharge vapor lamp device and a heat conservator in which said lamp device is mounted, said lamp device comprising a container, electrodes sealed therein and a septum dividing the stem part of said container from the other parts thereof, the discharge path between said electrodes being in closer proximity to said septum than to the end parts of said container opposite said septum and said stem.

2. A lamp unit comprising in combination a gaseous electric discharge vapor lamp device and a heat conservator in which said lamp device is mounted, said lamp device comprising a container, electrodes sealed therein and a septum dividing the stem part of said container from the other parts thereof, said septum being at an appreciable distance from the end of said stem, the discharge path between said electrodes being in closer proximity to said septum than to the end parts of said container opposite said septum and said stem.

3. A lamp unit comprising in combination a gaseous electric discharge vapor lamp device and a heat conservator in which said lamp device is mounted, said lamp device comprising a container, electrodes sealed therein and a septum dividing the stem part of said container from the other parts thereof, said conservator being a double walled jacket surrounding said lamp device and having the space between the walls thereof evacuated, the outer wall of said jacket being enlarged at the part thereof adjacent the end of said lamp container opposite the stem end thereof.

4. A lamp unit comprising in combination a gaseous electric discharge vapor lamp device and a heat conservator in which said lamp device is mounted, said lamp device comprising a container, electrodes sealed therein and a septum dividing the stem part of said container from the other parts thereof, said conservator being a double walled jacket surrounding said lamp device and having the space between the walls thereof evacuated, the outer wall of said jacket being enlarged at the part thereof adjacent the end of said lamp container opposite the stem end thereof and the inner wall of said jacket adjacent the enlarged part of said outer wall being roughened.

5. A gaseous electric discharge device comprising a container, electrodes sealed therein and a gaseous atmosphere therein, said container providing a tubular chamber in which said electrodes are mounted, the discharge path between said electrodes being in closer proximity to one end of said chamber than to the opposite end thereof.

6. A lamp unit comprising in combination a light transmitting, heat retaining means and a gaseous electric discharge lamp device mounted therein, said lamp device comprising a container, electrodes sealed therein and a gaseous atmosphere therein, said container providing a tubular chamber in which said electrodes are mounted, the discharge path between said electrodes being in closer proximity to one end of said chamber than to the opposite end thereof.

GILLES HOLST.
WILLEM UYTERHOEVEN.